Sept. 6, 1927.
A. W. HULL
1,641,679
REGULATING APPARATUS
Filed Nov. 18, 1925  2 Sheets-Sheet 1
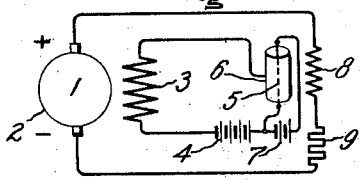
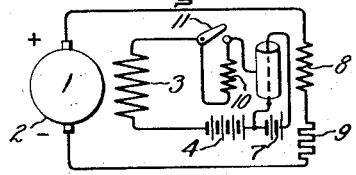
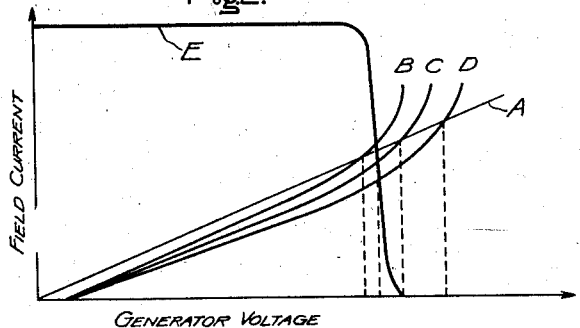
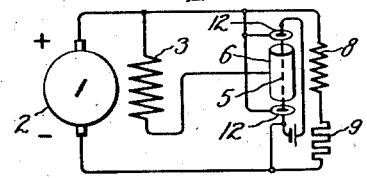
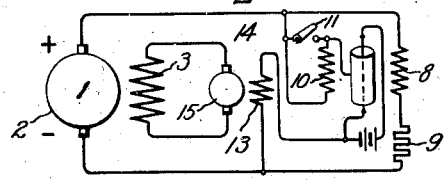
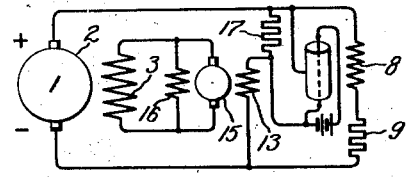
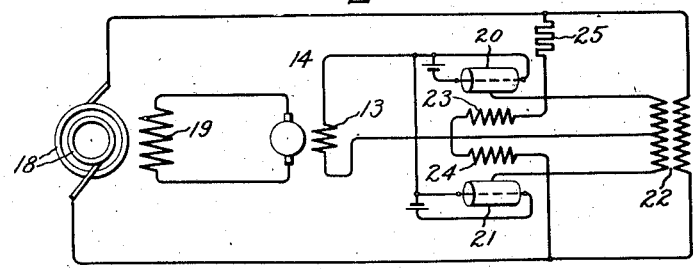
Inventor:
Albert W. Hull;
by *Alexander S. Lynn*
His Attorney.

Sept. 6, 1927.  A. W. HULL  1,641,679
REGULATING APPARATUS
Filed Nov. 18, 1925   2 Sheets-Sheet 2

Inventor:
Albert W. Hull;
by
His Attorney.

Patented Sept. 6, 1927.

1,641,679

UNITED STATES PATENT OFFICE.

ALBERT W. HULL, OF SCHENECTADY, NEW YORK, ASSIGNOR TO GENERAL ELECTRIC COMPANY, A CORPORATION OF NEW YORK.

REGULATING APPARATUS.

Application filed November 18, 1925. Serial No. 69,852.

My invention relates to apparatus for regulating the electrical conditions of a machine or circuit, and has for its principal object the provision of an improved regulating apparatus that comprises few parts and is both sensitive and reliable in its operation.

It is desirable that apparatus for regulating an electrical condition, such as the voltage of a circuit, be both sensitive to variation in the condition to be regulated and capable of responding to such variation without appreciable lag. In accordance with my invention, this result is produced by means of a magnetically controlled electric valve provided with a control winding which is energized in accordance with variation in the condition to be regulated.

My invention will be better understood from the following description when considered in connection with the accompanying drawing and its scope will be pointed out in the appended claims.

Figure 8:
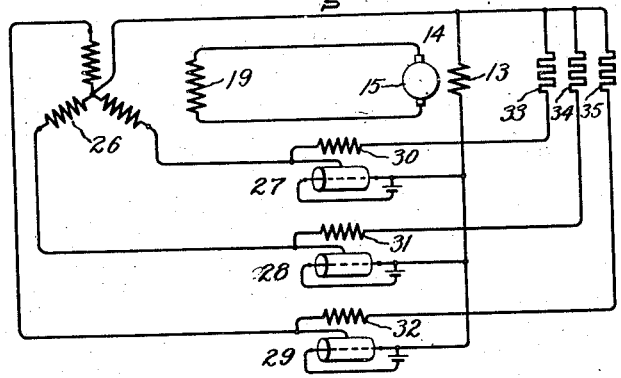
Figure 9:
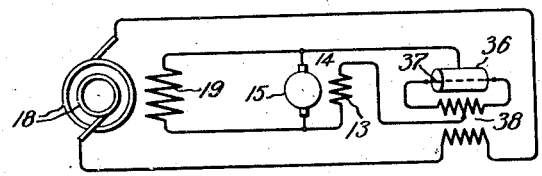
Figure 10:
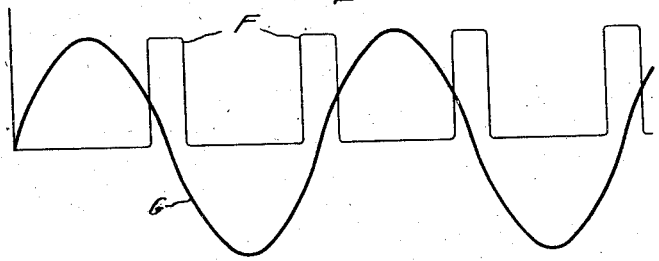
Figure 11:
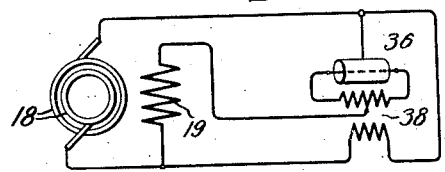

Referring to the drawing, Figs. 1 and 3 to 6 show different ways of utilizing the apparatus to regulate the voltage of direct current circuits; Fig. 2 is an explanatory diagram illustrating certain details in the operation of the apparatus shown in Figs. 1 to 5; Figs. 7 and 8 show the apparatus as utilized to regulate the voltage of alternating current circuits; Figs. 9 and 11 show arrangements wherein the heating current of the valve cathode is controlled in accordance with the generator voltage; and Fig. 10 is an explanatory diagram illustrating certain features in the operation of the apparatus shown by Figs. 9 and 11.

Fig. 1 shows a direct current machine 1 comprising an armature winding 2 and a field winding 3 which is adapted to be supplied with current from a source 4 through a magnetically controlled electric valve comprising a cathode 5 and an anode 6. It should be understood that the cathode 5 and anode 6 are located in an evacuated vessel, that a source 7 is provided for supplying heating current to the cathode 5, and that a magnetic field coil 8 is connected to the armature winding 2 through an impedance device 9 for producing a magnetic field whereby the transmission of current between the cathode and anode is controlled.

The regulating characteristics of the apparatus are indicated in Fig. 2. This figure shows a straight line A that represents the field current as a function of the voltage of the ordinary shunt generator, curves B, C and D which represent the voltage of the generator as a function of the field current for different load and speed conditions and a curve E that represents the field current as a function of the generator voltage when the valve is connected in series with the generator field winding. The intersection of the curves B, C and D with the curve A indicate the voltage that is to be expected under different load conditions with the usual shunt excitation. The intersection of the curves B, C and D with the curve E indicate the voltages that are to be expected with the magnetically controlled valve connected in series with the field circuit. It will be noted that the variation of generator voltage with change in generator load is greatly reduced by the interposition of the valve in the field circuit. These variations may be made as small as desired by making the vertical portion of the curve E sufficiently steep. This result may be accomplished either by making the voltage of source 4 sufficiently high or by providing the valve with an additional magnetic field winding in series with the valve.

The operation of the apparatus will be readily understood if it be assumed that the turns of the coil 8 and the potential of the battery are so related as to maintain normal voltage on the generator when it is operating at full load. If the generator voltage decreases due to change in the generator load or for other reasons, the magnetic field of the winding 8 is weakened and more current is supplied to the generator field winding 3, thus tending to restore the generator voltage to its normal value. Likewise if the generator voltage increases, the magnetic field of the winding 8 is strengthened, less current is supplied to the field winding 3 and the generator voltage tends to be restored to its normal value. Any departure of the generator voltage from its normal value thus immediately brings into operation a force tending to restore it to its normal value.

Fig. 3 shows the magnetically controlled valve as provided with an additional magnetic field winding 10 which is connected to the valve in series with the generator field winding 3 and is adapted to be short circuited by a switch 11. As previously indicated, the winding 10 functions to make the vertical part of the curve E steeper. The switch 11 may thus be regarded as a means of changing the regulating characteristics of the apparatus.

Fig. 4 shows an arrangement wherein the current-carrying capacity of the magnetically controlled valve is increased by the addition of positively charged end plates 12 inside the valve. The function of these end plates is to prevent by electric repulsion the escape of positive ions from the ends of the cylinder, thus allowing these ions to accumulate and neutralize the space-charge of the electrons. The operation is the same as in the arrangement shown in Fig. 1, except that the power for energizing the field winding 3 and the magnetic field winding 8 is derived from the armature winding 2 of the generator.

Fig. 5 shows an apparatus wherein current is supplied from the generator armature winding 2 to the field winding 13 of an exciter 14 provided with an armature winding 15 for supplying current to the generator field winding 3. The exciter field winding 13 is connected to the generator terminals through the magnetically controlled device and the magnet field winding 10 which is adapted to be short circuited by the switch 11.

Fig. 6 shows an arrangement which differs from that of Fig. 5 in that the exciter is provided with a differential field winding 16, the series magnetic field winding 10 is omitted, and the magnetically controlled valve is shunted by a resistor 17 to facilitate starting.

Since the arrangements of Figs. 3 to 6 operate in a manner similar to that of Fig. 1, a detailed explanation of their operation will be unnecessary.

Fig. 7 shows the invention as applied to an alternating current generator comprising an armature circuit 18 and a field circuit 19 which is interconnected with the exciter 14. In this arrangement a pair of magnetically controlled valves 20 and 21 are connected to the generator terminals through a transformer 22 for rectifying alternating current and supplying the rectified current to the field winding 13 of the exciter. It will be observed that the magnetic field windings 23 and 24 of the valves 20 and 21 respectively are connected to the alternating current circuit in series with an impedance device 25.

With these connections, variation in the voltage of the alternating current circuit changes the magnetic fields of the valves 20 and 21 in a manner to decrease the current supplied from the transformer 22 through the valves to the exciter field winding when the circuit voltage increases above its normal value and to increase this current when the circuit voltage tends to fall below its normal value. It will be apparent that the valves 20 and 21 function successively during alternate half cycles both to rectify the current supplied to the exciter field circuit and to regulate the magnitude of this current in accordance with variation in the voltage of the alternating current circuit.

Fig. 8 shows the application of the invention to a polyphase alternating current generator comprising a three-phase armature winding 26 and a field winding 19 which is inter-connected with the exciter 14. The exciter field winding 13 is connected between the terminals and neutral of the polyphase winding 26 through valves 27, 28 and 29 which are provided with magnetic field control windings 30, 31 and 32 connected between the terminals and neutral of the winding 26 through impedance devices 33, 34 and 35 respectively. The operation of this apparatus will be apparent from the explanation of the preceding figures.

Fig. 9 shows an arrangement wherein the exciter field winding 13 is connected to the exciter armature terminals and wherein the exciting current supplied from the armature winding 15 is regulated by a valve 36 comprising a cathode 37. Current for heating the cathode 37 is supplied from the alternating current circuit through a transformer 38. Under these conditions, if the diameter of the cathode 37 is properly chosen with respect to the voltage of the armature 15, the electron emission of the cathode 37 and hence the exciter field current is controlled by the current through the cathode, which varies in accordance with the voltage of the alternating current generator 18.

The operation of the circuit shown in Fig. 9 will be evident from Fig. 10, in which the exciter field current is indicated by the curve F and the generator voltage is indicated by the curve G. It should be noted that current is transmitted to the exciter field winding 13 only during time intervals when the instantaneous voltage of the generator is within predetermined limits, and that this interval will be shortened or lengthened depending on whether the effective value of the generator voltage increases or decreases. Any departure of the generator voltage from its normal value thus immediately changes the generator excitation in a manner tending to restore the voltage to its normal value.

Fig. 11 shows an apparatus which differs from that of Fig. 9 in that the exciter 14 is omitted and current is supplied to the generator field winding 19 from the alternating current circuit through the valve 36 which functions as previously set forth.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:—

1. The combination of a circuit, control means operable to change an electrical condition of said circuit, and an electrical valve provided with a cathode and anode connected to said circuit in series with said control means and with a winding connected to said circuit for producing a magnetic field between said cathode and anode which varies in accordance with said condition.

2. The combination of a machine comprising field and armature circuits, and means for controlling the current transmitted to said field circuit comprising an electric valve provided with a cathode and an anode connected to said armature circuit and with a winding connected to said armature circuit for producing a magnetic field whereby the current of said valve is regulated in accordance with an electrical condition of said armature circuit.

3. The combination of a circuit, control means operable to change an electrical condition of said circuit, an electron discharge device provided with a cathode and anode connected to said circuit for transmitting current to said control means and with a winding connected to said circuit for producing a magnetic field between said cathode and anode whereby said current is regulated in accordance with said condition, and means connected between said cathode and anode in series with said control means for modifying the regulating effect of said winding on said current.

4. The combination of a circuit, control means operable to change an electrical condition of said circuit, an electron discharge device provided with a cathode and anode for transmitting current to said control means and with a winding connected to said circuit for regulating said current in accordance with said condition, and a second winding connected in series with said control means for modifying the regulating effect of said first mentioned winding on said current.

5. The combination of a circuit, control means operable to change an electrical condition of said circuit, an electron discharge device provided with a cathode and anode for transmitting current to said control means and with a winding connected to said circuit for regulating said current in accordance with said condition, a second winding connected between said cathode and anode in series with said control means for modifying the regulating effect of said first mentioned winding on said current, and means for rendering said second mentioned winding inoperative.

I witness whereof, I have hereunto set my hand this 17th day of November, 1925.

ALBERT W. HULL.